US008333251B2

(12) United States Patent
Cecchin et al.

(10) Patent No.: US 8,333,251 B2
(45) Date of Patent: Dec. 18, 2012

(54) CONTROL METHOD AND HAND-HELD POWER TOOL

(75) Inventors: Holger Cecchin, Puchheim (DE); Erwin Manschitz, Germering (DE); Germar Meiendres, Landsberg (DE); Franz Moessnang, Landsberg (DE); Stefan Hammerstingl, Munich (DE)

(73) Assignee: Hilti Aktiengesellschaft, Schaan (LI)

(*) Notice: Subject to any disclaimer, the term of this patent is extended or adjusted under 35 U.S.C. 154(b) by 361 days.

(21) Appl. No.: 12/657,852

(22) Filed: Jan. 28, 2010

(65) Prior Publication Data

US 2010/0193205 A1 Aug. 5, 2010

(30) Foreign Application Priority Data

Jan. 30, 2009 (DE) ........................ 10 2009 000 515

(51) Int. Cl.
*B23Q 15/24* (2006.01)

(52) U.S. Cl. ................................ 173/1; 173/6; 173/113

(58) Field of Classification Search ............. 173/1, 4–6, 173/113

See application file for complete search history.

(56) References Cited

U.S. PATENT DOCUMENTS

| | | | | |
|---|---|---|---|---|
| 4,284,148 | A | 8/1981 | Wanner et al. | |
| 5,142,210 | A * | 8/1992 | Kojima et al. | 318/566 |
| 5,984,020 | A | 11/1999 | Meyer et al. | 173/2 |
| 6,484,814 | B2 * | 11/2002 | Bongers-Ambrosius | 173/2 |
| 6,640,205 | B2 * | 10/2003 | Bongers-Ambrosius et al. | 702/190 |
| 6,843,140 | B2 | 1/2005 | Osselmann et al. | 73/862.08 |
| 6,843,327 | B2 | 1/2005 | Meixner et al. | 173/11 |
| 2002/0003045 | A1 | 1/2002 | Bongers-Ambrosius | 173/201 |
| 2002/0050168 | A1 * | 5/2002 | Bongers-Ambrosius et al. | 73/584 |
| 2005/0000998 | A1 * | 1/2005 | Grazioli et al. | 227/2 |
| 2005/0023014 | A1 | 2/2005 | Bermingham et al. | 173/2 |

FOREIGN PATENT DOCUMENTS

| | | | |
|---|---|---|---|
| DE | 28 20 128 | | 11/1979 |
| DE | 43 34 933 | C2 | 4/1995 |
| DE | 196 28 945 | A1 | 5/1997 |
| DE | 100 33 362 | A1 | 1/2002 |
| DE | 101 17 123 | A1 | 10/2002 |
| DE | 102 37 898 | B3 | 3/2004 |
| DE | 10 2005 028918 | A1 | 12/2006 |
| EP | 0 303 651 | | 2/1989 |
| EP | 1 109 034 | A1 | 6/2001 |
| EP | 1 170 095 | A2 | 1/2002 |
| EP | 1 645 230 | A2 | 4/2006 |

OTHER PUBLICATIONS

EPO machine translation of DE 196 28 945 A1 (4 pages).

* cited by examiner

*Primary Examiner* — Rinaldi Rada
*Assistant Examiner* — Andrew M Tecco
(74) *Attorney, Agent, or Firm* — Davidson, Davidson & Kappel, LLC

(57) ABSTRACT

A pneumatically striking hand-held power tool is controlled by the following steps. An acceleration (a) along a striking axis (8) of the hand-held power tool (1) is detected. A driving power is reduced if the detected acceleration (a) is greater than a threshold value (A), the threshold value (A) being selected to be greater than maximum acceleration values (a1, a2) that occur on a workpiece during the striking operation of the hand-held power tool (1).

13 Claims, 4 Drawing Sheets

CONTROL METHOD AND HAND-HELD POWER TOOL

This claims the benefit of German Patent Application No. 10 2009 000 515.3, filed Jan. 30, 2009 and hereby incorporated by reference herein.

The present invention relates to a method for controlling a pneumatically, especially an electro-pneumatically, striking hand-held power tool and it also relates to an electro-pneumatically striking hand-held power tool.

BACKGROUND

EP 0 303 651 B1 discloses a method for interrupting the drive action of an electro-pneumatic chiseling hammer or hammer drill. This method serves to interrupt the drive train in case of jamming in order to protect the user. The jamming of a chiseling hammer is detected on the basis of the position of a tool or of a striking element in a striking mechanism. The jamming of a rotational motion is detected on the basis of acceleration values being exceeded.

Owing to its design, the electro-pneumatic chiseling hammer from DE 28 20 128 cited in EP 0 303 651 B1 switches off when a user lifts the chiseling hammer. A tool engages with a stop installed in the striking axis. A freely moving piston can now move forward to such an extent that the freely moving piston no longer closes off a ventilation opening arranged in the guide tube between the freely moving piston and an exciter piston. The exciter piston can no longer draw in the freely moving piston since a pressure equalization occurs via the ventilation opening. The striking mechanism is thus deactivated in a passive manner. As soon as the user puts down the chiseling hammer, the freely moving piston is pushed through the tool via the ventilation opening. The exciter piston can once again draw in the freely moving piston and the striking mechanism is active.

SUMMARY OF THE INVENTION

An object of the present invention is to provide a method that reduces the power consumption of an electro-pneumatically striking hand-held power tool when it is lifted off of a workpiece, i.e. when no counter-force is acting on an electro-pneumatic striking mechanism.

The method according to the invention for controlling an electro-pneumatically striking hand-held power tool provides the following steps: the acceleration that is present along a striking direction of the hand-held power tool is detected; and the driving power is reduced if the detected acceleration is greater than a threshold value, the threshold value being selected to be greater than accelerations that occur on a workpiece during the striking operation of the hand-held power tool.

A freely moving piston can periodically strike a tool, if applicable via an interconnected punch, when the tool is in contact with a workpiece, i.e. in the intended application operation. The pulse and the kinetic energy of the freely moving piston are transmitted to the tool and into the workpiece. The occurring acceleration values of the coupled system consisting of the freely moving piston and the tool are low due to their combined mass. Moreover, the freely moving piston or the punch are typically stopped by the tool before they reach a catching device in the striking direction. The acceleration values transmitted to the hand-held power tool are low during the striking in the intended application operation.

During an empty strike, i.e. when the tool does not make contact with a workpiece, the pulse and the entire kinetic energy of the freely moving piston can be transmitted into the catching device of the hand-held power tool. The acceleration values that occur are relatively large in comparison to the intended application operation.

The occurring accelerations, for example, the appertaining peak values during the intended operation as well as during an empty strike, are prescribed by the design and by the output of the hand-held power tool and, at times, also by the tool. The acceleration values for a given type of hand-held power tool can be measured. The threshold value can be selected, taking the measured values into consideration.

One aspect of the invention relates to a hand-held power tool having a drive shaft, a pneumatic striking mechanism, an acceleration sensor and an evaluation device for carrying out the above-mentioned control method.

In a refinement, a residual strike is detected by checking at least one of the following criteria. First criterion: the acceleration occurs in the striking direction and its magnitude exceeds the threshold value; second criterion: the magnitude of the acceleration exceeds the threshold value twice within a first time span, and third criterion: the magnitude of the acceleration exceeds the threshold value twice within a second time span. The driving power is reduced if a residual strike is detected.

If the hand-held power tool is put down onto a workpiece forcefully, a high acceleration can occur, whose magnitude exceeds the threshold value. In this case, however, the power should not be reduced since, in this case, a user would like to remove material from the workpiece. On the basis of the direction of the acceleration, a distinction can be made between an empty strike and a forceful placement of the power tool. When the power tool is put down forcefully, the exerted forces move from the tool in the direction of the hand-held power tool. In the case of an empty strike, forces occur in the striking direction as well as in the opposite direction. Therefore, it can be advantageous to ascertain an empty strike on the basis of the forces that occur in the striking direction and/or on the basis of the acceleration being exceeded twice by the negative and the positive peak values. By the same token, one can utilize the knowledge that an empty strike always occurs with a prescribed period.

One embodiment provides that, for the third criterion, either the magnitude of the acceleration exceeds the threshold value once in the striking direction and once opposite to the striking direction, or else the magnitude of the acceleration falls back to zero between the times when it exceeds the threshold value twice. The second time span can be selected shorter than the time span between two strikes on a workpiece during the striking operation.

The empty strike occurs periodically, whereby the period is prescribed by the drive. One embodiment provides that the first time span is selected as a function of the current rotational speed of a drive shaft. The first time span can be the inverse of the current rotational speed.

A refinement provides that, after a residual strike has been detected, the driving power is reduced from high driving power to medium driving power. The threshold value can be exceeded one time due to an unexpected event. If the exceeding that can be expected to follow a residual strike does not take place, the driving power can be quickly increased again. Otherwise, the driving power is already reduced and a reduction to an idling mode with low driving power can likewise take place quickly.

A refinement provides that the driving power is decreased to a low driving power if, after a residual strike has been detected, a residual strike is detected once again within a third time span.

The driving power can be increased to a high driving power if, after a residual strike has been detected, no further residual strike is detected once again within a fourth time span. The control method makes the full power of the drive available and starts its procedure from the beginning if no further residual strike is detected. The residual strike stops, for example, if the user places the hand-held power tool onto a workpiece or if the freely moving piston of the striking mechanism comes to a standstill.

The third or fourth time span can be selected as a function of the current rotational speed of a drive shaft. A residual strike takes place in a rhythm that is prescribed by the drive shaft. Consequently, on the basis of the rotational speed, it can be ascertained at which time interval a second residual strike would have to take place after a first residual strike.

In a refinement, the rotational speed of a drive shaft is established in order to set the driving power. The low rotational speed for the low driving power can be selected at less than 35% of the high rotational speed for the high driving power. A medium rotational speed for the medium driving power can be selected between 75% and 85% of the high rotational speed for the high driving power. A resonant rotational speed resonantly excites the pneumatic striking mechanism of the hand-held power tool and a high rotational speed that diverges by less than 10% from the resonant speed can be selected for the high driving power. The resonant excitation is characterized in that the excitation power is transmitted with the highest efficiency into the striking mechanism.

One embodiment provides that the acceleration sensor and the evaluation device are integrated into an electronic module.

BRIEF DESCRIPTION OF THE DRAWINGS

The following description explains the invention on the basis of embodiments and figures by way of an example. The figures show the following.

DETAILED DESCRIPTION

Figure 1:
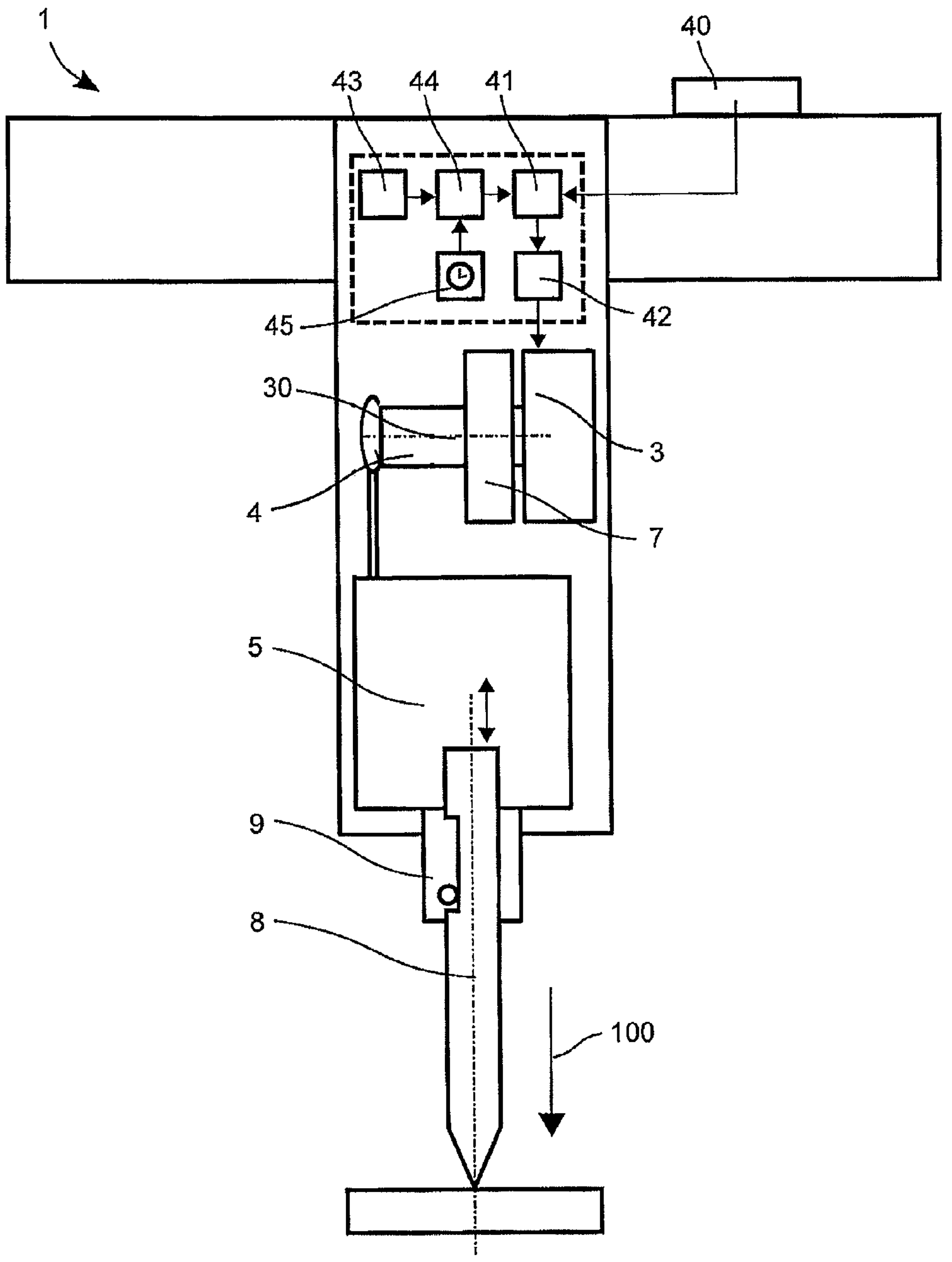
FIG. 1 an electro-pneumatic chiseling hammer.

Unless indicated otherwise, elements that are identical or that have the same function are designated by the same reference numerals in the figures.

As an example of a striking hand-held power tool, FIG. 1 schematically shows an electro-pneumatic chiseling hammer 1; other examples, not shown here, include hammer drills or combination hammers.

A drive train consisting of a primary drive 3, of a drive shaft 4 and of a striking mechanism 5 is arranged in a machine housing 2. A gear 7 can be interconnected between the primary drive 3 and the drive shaft 4. The primary drive 3 is preferably an electric motor, for example, a universal motor or a brushless motor. The drive shaft 4 is rotated at speeds in the range between 1 Hz and 100 Hz, for example, at 10 Hz to 60 Hz, by the primary drive 3. The rotational motion of the drive shaft 4 is converted by the striking mechanism 5 into a periodical striking motion along a striking axis 8. A tool held in a tool holder 9 is driven out of the chiseling hammer 1 by the periodical strikes along the striking axis 8 in the striking direction 100. The retraction of the tool into the chiseling hammer 1 opposite to the striking direction 100 is effectuated by pressing the chiseling hammer 1 against a workpiece.

Figure 2:
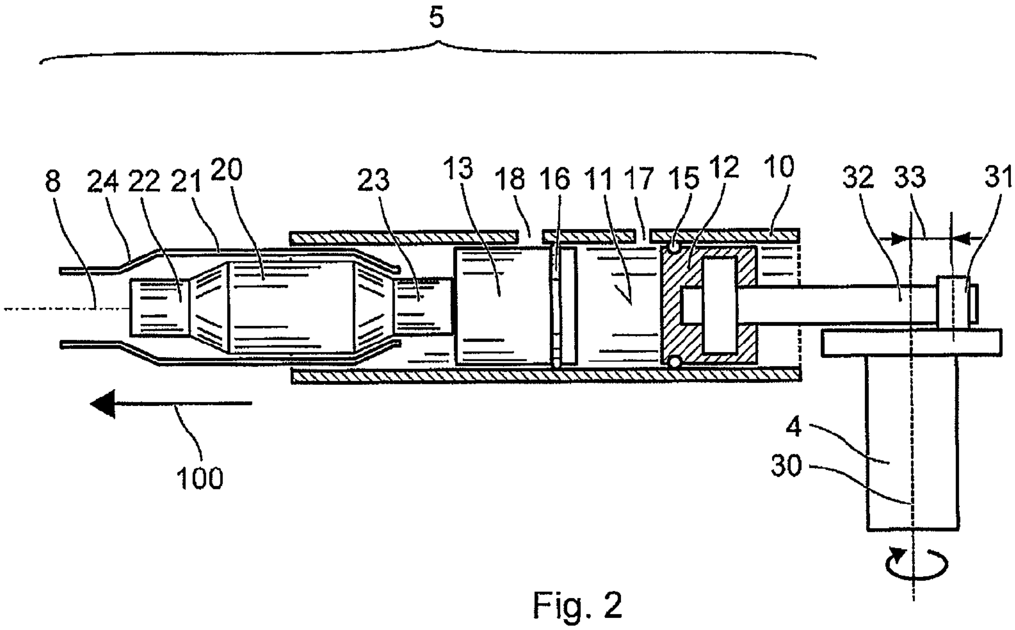
FIG. 2 the striking mechanism of an electro-pneumatic chiseling hammer.

FIG. 2 shows a striking mechanism 5 by way of an example.

A guide tube 10 guides an exciter piston 12 and a freely moving piston 13 along the striking axis 8. The exciter piston 12 and the freely moving piston 13 are configured to be positively connected to an inner wall 11 of the guide tube 10. An air-tight seal can be achieved by O-rings 15, 16. In the area of the exciter piston 12, a first ventilation opening 17 connects an inner space of the guide tube. 10 with an outer space of the guide tube 10. In the area of the freely moving piston 13, a second ventilation opening connects an inner space of the guide tube 10 with an outer space of the guide tube 10.

At an end of the guide tube 10 situated on the tool side, a punch 20 is supported in a punch guide 21. The punch guide 21 limits the movement of the punch 20 in the striking direction 100 and opposite to the striking direction 100. An end 22 facing the tool is in contact with a tool that is held in the tool holder 9. An end 23 of the punch 20 facing away from the tool protrudes out of the punch guide 21 into the inner space of the guide tube 10.

The exciter piston 12 is forced by the drive shaft 4 to make a periodical motion along the striking axis 14. The drive shaft 4 is rotated around its axis of rotation 30 and, in the process, moves an eccentric pin 31 that is arranged eccentrically with respect to the axis of rotation 30. The eccentric pin 31 is connected by a linkage 32 to the exciter piston 12. Half of the stroke of the exciter piston 12 corresponds to approximately the distance 33 of the eccentric pin 31 from the axis of rotation 30.

Due to an air volume sealed by the exciter piston 12 in the guide tube 10, the freely moving piston 13 executes follows the forced motion of the exciter piston 12. When the exciter piston 12 is moved in the striking direction 100, the freely moving piston 13 is accelerated in the striking direction 100. The freely moving piston 13 strikes the end 23 of the punch 20 facing away from the tool. In this process, the pulse of the freely moving piston 13 is transmitted to the punch 20 and to the tool in a quasi-elastic strike. After the strike, the freely moving piston 13 is accelerated by the exciter piston 12 opposite to the striking direction 100 when the exciter piston 12 moves opposite to the striking direction 100. The motion sequence is repeated periodically at a frequency corresponding to the rotational speed of the drive shaft 4.

Figure 3:
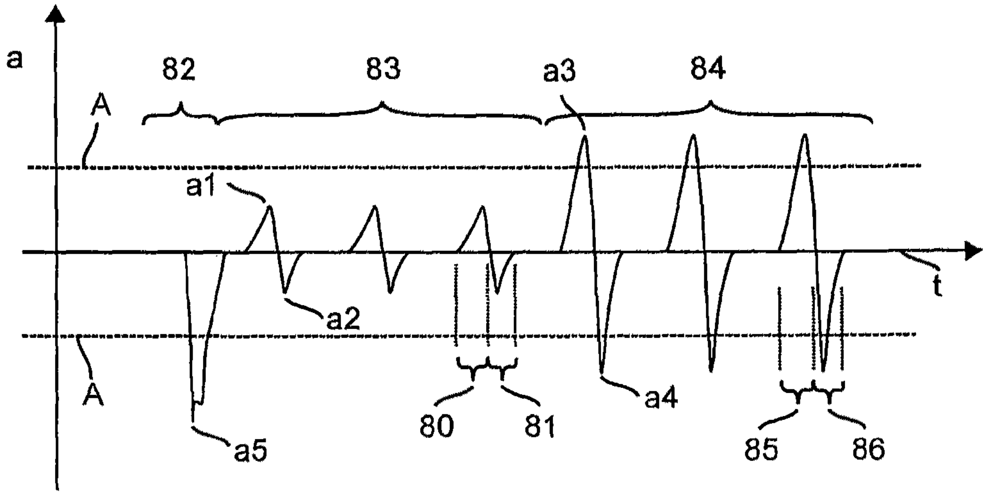
FIG. 3 schematic depiction of acceleration values during the operation of a chiseling hammer and FIG. 4 a flow chart of a control method.

FIG. 3 schematically shows the acceleration values a that occur in the machine housing 2, plotted over the time t, whereby a positive acceleration value a indicates an acceleration in the striking direction 100. First of all, a user places the hand-held power tool onto the tool 82. Then comes the intended application operation 83 in which the workpiece is processed by the strikes of the chiseling hammer 1. Subsequently, an empty strike 84 occurs because the user lifts the chiseling hammer 1, for example, in order to position it at a different place on the workpiece.

In the intended application operation 83, the strikes of the freely moving piston 13 on the punch 20 occur periodically at time intervals T, which are prescribed by the rotational speed of the drive shaft 4. The pattern of the acceleration a during one of the strikes can be divided into two phases 80, 81. In a first phase 80, a positive acceleration value a1 is detected, that is to say, an acceleration in the striking direction 100. This is to be ascribed to the case when the punch 20 and the tool are accelerated out of the hand-held power tool 1. Their acceleration a is presumably transmitted partially to the machine housing 2 due to the friction in the punch guide 21 and in the tool holder 9 as well as when the punch 20 strikes the end 24 of the punch guide 21 facing the tool. In the second phase 81, a negative acceleration value a2 is detected, whereby presumably a relaxation during the strike of elastically deformed components and/or the rebound of the punch 20 at the end 25 of the punch guide 21 contribute to this negative acceleration value a2. The peak values and the time integrals of the positive acceleration value a1 and of the negative acceleration value a2 can differ, but they are typically not different by more than a factor of two.

When a user lifts the chiseling hammer 1 off from the workpiece, the punch 20 and the tool cannot transfer the pulse transmitted by the freely moving element 13 to a workpiece, but rather they strike the appertaining ends 24 of their guides 21 without being decelerated. This is referred to as an "empty strike". Therefore, high acceleration values a3, a4 result in the machine housing 2 during the empty strike 84. Depending on the design of the chiseling hammer 1 and on the mass of the tool, the amplitude of the acceleration values a3, a4 is greater by a factor of at least two than the acceleration values a1, a2 during the intended application operation 83, i.e. during the striking against a workpiece.

Passive solutions are known that prevent a periodical occurrence of empty strikes. During an empty strike, the freely moving piston 13 has to traverse a greater distance since the punch 20 is moved in the striking direction 100. The distances are dimensioned in such a way that, during the empty strike, a movement sequence of the freely moving piston 13 gets out of resonance relative to the excitation by the exciter piston 12. In addition, the ventilation opening 18 can be arranged in such a way that, during an empty strike, the ventilation opening 18 ventilates the inner space of the guide tube 10 between the freely moving piston 13 and the exciter piston 12. The movement of the freely moving piston 13 on the exciter piston 12 is uncoupled in such a way that the freely moving piston 13 remains stationary between the punch 20 and the ventilation opening 18. However, the design freedom, especially the length, of the striking mechanism 5 is thus limited by the desired switch-off behavior during an empty strike.

An empty strike 84 can likewise be divided into two phases 85, 86. In the first phase 85, there is a positive acceleration value a3, i.e. an acceleration a in the striking direction 100. The positive acceleration value a3 correlates, among other things, with the strike of the freely moving element 13 and/or of the punch 20 in ends 24 of its guides 10, 21 facing the tool. In the second phase 86, there is a negative acceleration value a4, whereby presumably a relaxation of components that were elastically deformed during the first phase 85 and/or the rebound of the punch 20 at the end 25 of the punch guide 21 contribute to this negative acceleration value a4. The time interval between two empty strikes corresponds to the period T or to the specification by the current rotational speed of the drive shaft 4.

The placement 82 of the chiseling hammer 1 onto a workpiece has a different signature regarding the acceleration a5 that occurs. The acceleration value a5 can be approximately equal to the absolute acceleration values a3, a4. The amplitude and the time integral of the acceleration values when the chiseling hammer 1 is placed are highly dependent on the user, on the workpiece and on the situation such as, for example, in case a breakthrough is involved. However, the strike typically exhibits only one single phase with negative acceleration values, that is to say, an acceleration a opposite to the striking direction 100. Moreover, the chiseling hammer is normally placed once again after an interval of just a few seconds, so that, within a period T, a corresponding acceleration a5 only occurs once.

When the chiseling hammer 1 is placed, the user typically wants to have the maximum available striking power. When the chiseling hammer 1 is lifted off, any empty strike should be suppressed to the greatest extent possible in order to reduce the stress on the chiseling hammer 1 and on the user.

Figure 4:
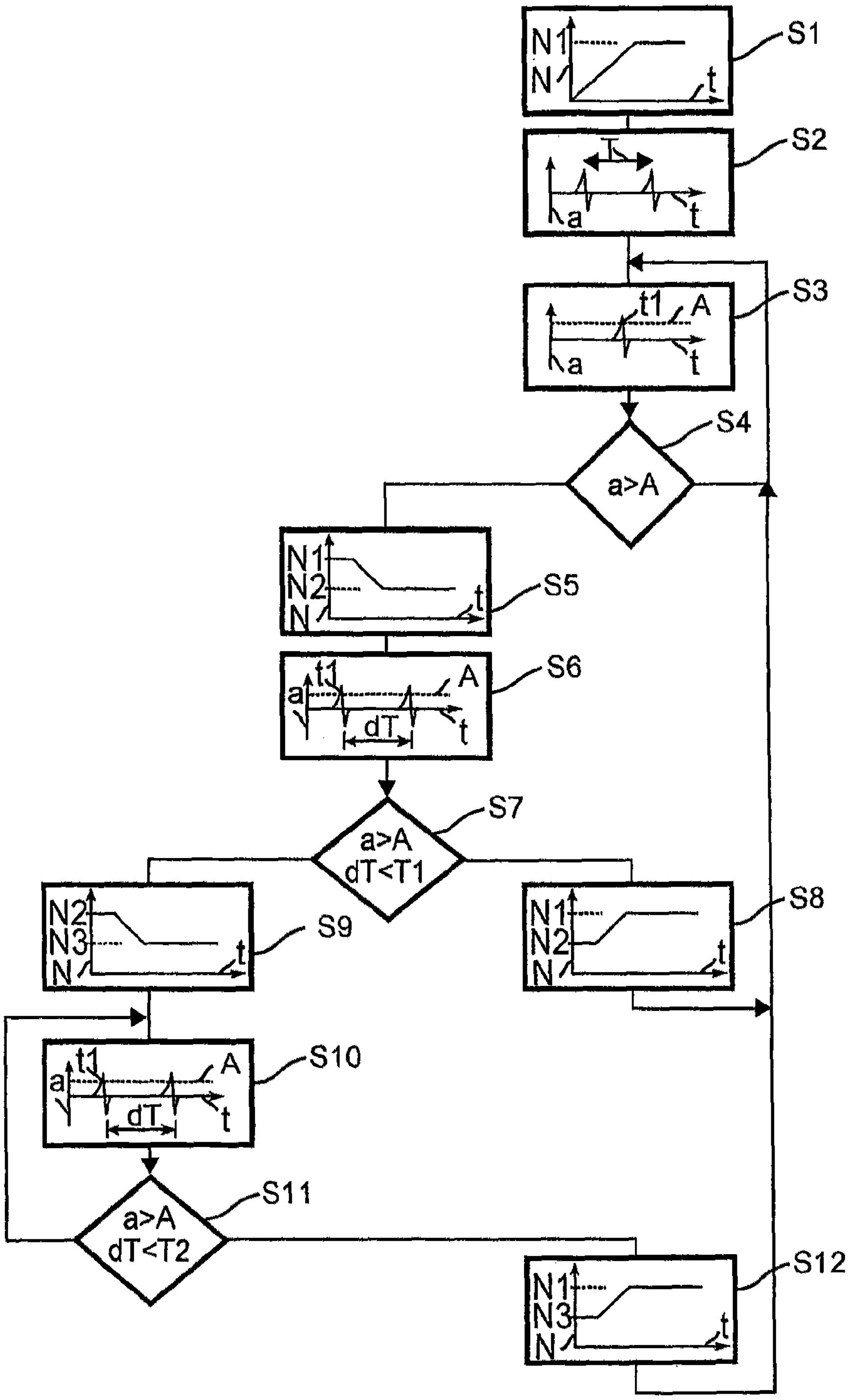

In conjunction with the flow chart of FIG. 4, a control method for the chiseling hammer 1 is described by way of an example.

In response to an actuation of a system switch 40, a system control unit 41 is activated or triggered. The system control unit 41 instructs a motor control unit 42 to accelerate the primary drive 3 (S1). In this process, the rotational speed N of the drive shaft 4 reaches a high rotational speed N1. The high rotational speed N1 can be in the range from 80% to 100% of the maximum rated speed. The high rotational speed N1 is preferably harmonized with the striking mechanism 5 in such a way that the exciter piston 12 resonantly excites the movement of the freely moving piston 13. Once the high rotational speed N1 has been reached, the striking mechanism 5 strikes within the interval of the period duration T (S2). The period duration T between two strikes corresponds to the inverse of the high rotational speed N1 or to a whole-number multiple of the inverse of the high rotational speed N1.

An acceleration sensor 43 detects the acceleration a that occurs. The acceleration sensor 43 can be arranged in the striking mechanism 5, on the guide tube 10 of the striking mechanism 5, in an electronic group for actuating the primary drive 4 outside of the striking mechanism 5, for example, the system control unit 41, or at other places within the machine housing 2. The signals of the acceleration sensor 43 are relayed to an evaluation unit 44.

The evaluation unit 44 compares the occurring acceleration values a to a threshold value A (S3). The threshold value A is greater than the acceleration values a1 that typically occur in the intended application operation 83, and less than the typical acceleration values a5 during an empty strike 84. The threshold value A has to be adapted to the particular chiseling hammer 1 and, if applicable, also to the tool that is going to be used. In the embodiment shown, the evaluation unit 44 only responds to positive acceleration values a, i.e. to an acceleration in the direction of the striking axis 100.

A branching S4 of the control method takes place with the result that, if the threshold value A is exceeded by a positive acceleration value a (left-hand branch of the flow chart). Otherwise, the evaluation unit 44 continues to monitor the acceleration values a that occur (right-hand branch of the flow chart).

In response to the threshold value A being exceeded, the point in time t1 when it was exceeded can be ascertained. The evaluation unit 44 can, for example, start or reset a timing pulse generator 45.

The evaluation unit 44 instructs the system control unit 41 to reduce the rotational speed of the drive shaft 4 to a medium rotational speed N2 (S5). The medium rotational speed N2 can be 15% to 30% lower than the previously set high rotational speed N1.

The evaluation unit 44 checks whether, within a time span T1, the threshold value A is exceeded once again (S6). The evaluation unit 44 can be triggered, for example, by the timing pulse generator 45 that had previously been started or reset by the evaluation unit 44. The time span T1 is longer than the period duration T, for example, 0% to 50% greater. The time span T1 can be determined as a function of the current medium rotational speed N2. During an empty strike 84, another empty strike and corresponding acceleration values a4, a5 are expected within the time span T1 since the last empty strike.

A branching S7 of the control method takes place when either the time span T1 or the threshold value A is exceeded another time. If, on the one hand, the threshold value A is not exceeded within the time span T1, the rotational speed N of the drive shaft is increased to the high rotational speed N1 (S8). The chiseling hammer 1 operates again at full power. The control method returns to step S3.

If, on the other hand, the threshold value A is exceeded once again within the time span T1, the rotational speed N of the drive shaft 4 is reduced to the low rotational speed N3 (S9). The low rotational speed N3 can be, for example, 10% to 30% of the maximum rated speed. The low rotational speed N3 is preferably selected in such a way that the excitation of its motion by the exciter piston 12 lies outside of a resonance. The coupling of the motion of the exciter piston 12 to the freely moving piston 13 diminishes and less energy can be transmitted. In another embodiment, it is provided that the primary drive 3 is completely switched off.

Moreover, a ventilation opening 18 can be provided that, during an empty strike, is opened, at least for part of the time. The ventilation opening 18 can be arranged in the same manner as in the case of the passive empty strike attenuation described above. The freely moving element 13 seals the ventilation opening 18 when the freely moving element 13 is in contact with the punch 20 that has retracted into the guide tube 10 all the way to the stop. The ventilation opening 18 is open when the freely moving element 13 can lie against a stop on the tool side, since the punch 20 has pulled out of the guide tube 10 all the way to a stop 24 on the tool side. Due to the ventilation opening 18, the coupling of the freely moving piston 13 is additionally weakened and the motion of the freely moving piston 13 can be halted, among other things, due to friction losses.

The evaluation unit 44 continuously checks whether additional empty strikes occur (S 10). The timing pulse generator 45 is reset by the evaluation unit 44, for example, every time the threshold value A is exceeded. If no further exceeding is ascertained within a second time span T2, then the control method branches out (S11). The rotational speed N of the drive shaft 4 is increased to the high rotational speed N1 (S12). The control method returns to step S3.

The time span T2 can be selected to be the same as the time span T1. As an alternative, the time span T2 can be selected to be up to five times, for example, three times, the period duration T. The time span T2 can be determined as a function of the current low rotational speed N2. If the striking mechanism 5 nevertheless displays residual strike, the time span T2 should be selected in such a way that another strike can be expected within T2.

At the changed low rotational speed N3, the striking mechanism 5 can transmit less energy to the freely moving element 13 and thus to the punch 20. Consequently, the empty strikes become weaker and the acceleration values a4, a5 of the empty strikes diminish. However, by increasing the rotational speed of the drive shaft 4 to the high rotational speed N1, it might be possible to excite the striking mechanism 5 once again. Therefore, in one refinement, the threshold value A is reduced when a first number of empty strikes, i.e. exceeding of the threshold value A, have been detected. The first number can be between three and ten. The threshold value A can also be continuously reduced to a lower threshold value A2 with each detected empty strike. The lower threshold value A2 can be, for example, half of the threshold value A, but it is greater than the acceleration values a1, a2 in the intended application operation.

After a certain number of empty strikes, the freely moving element 13 can come to a complete standstill. The result is that the freely moving element 13 comes to a standstill between the ventilation opening 18 and the punch 20. Even if the rotational speed of the drive shaft 4 is increased to the high rotational speed N1, the freely moving element 13 remains stationary. There is now a need for the chiseling hammer 1 to be placed onto a workpiece so that the workpiece pushes the freely moving element 13 over the ventilation opening 18 in order to couple the freely moving element 13 to the exciter piston 12 once again.

The embodiment described above makes a distinction between a placement and an empty strike on the basis of two criteria. First of all, only acceleration values a in the striking direction 100 are taken into account and secondly, it is checked whether a second strike (S6) occurs after a first strike (S3). In a simplified manner, the control method can use only one of the two criteria.

Another embodiment makes use of the fact that the acceleration a only has one phase during the placement, and two phases during the empty strike. In step S3, after the threshold value A has been exceeded, it is checked whether the threshold value A is exceeded again within a time span T3. The time span T3 within which the second phase occurs during the residual strike is characteristic of a chiseling hammer 1. The time span T3 can thus be measured and saved in the evaluation unit 44 in stored form. A refinement provides that it is checked that the acceleration values in the first and second phases have different algebraic signs. As an alternative, it can be checked whether a zero cross-over of the acceleration occurs between the two phases. The acceleration a can then be specified without an algebraic sign. The steps S6 and S10 can be adapted analogously.

In one embodiment, the rotational speed of the drive shaft 4 is reduced directly from the high rotational speed N1 to the low rotational speed N3, if, for the first time, an acceleration a is detected that is associated with a residual strike. The steps S5, S6, S7 and S8 can be dispensed with.

In another embodiment, the acceleration values are detected by strain gauges. The strain gauges are preferably arranged on the machine housing 2. The accelerations that occur give rise to a corresponding compression and strain of the machine housing 2 or of elements arranged in the machine housing 2. The acceleration is typically detected by the strain gauges as a change in a resistance value or in a capacitance.

What is claimed is:

1. A method for controlling a pneumatically striking hand-held power tool, comprising the steps of:

detecting an acceleration along a striking axis of the hand-held power tool; and reducing driving power if the detected acceleration is greater than a threshold value, the threshold value being selected to be greater than maximum acceleration values occurring on a workpiece during a striking operation of the hand-held power tool;

wherein the occurrence of a residual strike is detected by checking at least one of the following criteria:

first criterion: the acceleration occurs in the striking direction and its magnitude exceeds the threshold value;

second criterion: the magnitude of the acceleration exceeds the threshold value twice within a first time span and third criterion: the magnitude of the acceleration exceeds the threshold value twice within a second time span;

the driving power being reduced if a residual strike is detected.

2. The method as recited in claim 1 wherein the first time span is selected as a function of a current rotational speed of a drive shaft.

3. The method as recited in claim 1 wherein, for the third criterion, either the magnitude of the acceleration exceeds the threshold value once in the striking direction and once opposite to the striking direction, or else the magnitude of the acceleration falls back to zero between the times when it exceeds the threshold value twice.

4. The method as recited in claim 1 wherein the second time span is selected to be shorter than the time span between two strikes on a workpiece during the striking operation.

5. The method as recited in claim 1 wherein, after a residual strike has been detected, the driving power is reduced from high driving power to medium driving power.

6. The method as recited in claim 5 wherein the driving power is decreased to a low driving power if, after a residual strike has been detected, a residual strike is detected once again within a third time span.

7. The method as recited in claim 5 wherein the driving power is increased to a high driving power if, after a residual strike has been detected, no further residual strike is detected once again within a fourth time span.

8. The method as recited in claim 6 wherein the third time span is selected as a function of a current rotational speed of a drive shaft.

9. The method as recited in claim 7 wherein the fourth time span is selected as a function of a current rotational speed of a drive shaft.

10. The method as recited in claim 1 wherein a rotational speed of a drive shaft is established in order to set the driving power.

11. The method as recited in claim 10 wherein the driving power is reduced from a high driving power to a low driving power, a low rotational speed for the low driving power being selected at less than 35% of a high rotational speed for the high driving power.

12. The method as recited in claim 10 wherein the driving power is reduced from high driving power to a medium driving power, a medium rotational speed for the medium driving power being selected between 75% and 85% of the high rotational speed for the high driving power.

13. The method as recited in claim 10 wherein a resonant rotational speed resonantly excites the pneumatic striking mechanism of the hand-held power tool and a high rotational speed that diverges by less than 10% from the resonant speed is selected as a high driving power.

* * * * *